(12) United States Patent
Broussard et al.

(10) Patent No.: US 10,009,248 B2
(45) Date of Patent: *Jun. 26, 2018

(54) SYSTEM WITH ON-DEMAND STATE FOR APPLICATIONS

(71) Applicant: International Business Machines Corporation, Armonk, NY (US)

(72) Inventors: Scott J. Broussard, Cedar Park, TX (US); Jacob D. Eisinger, Austin, TX (US); Ritu Mehta, Austin, TX (US); Karthikeyan Ramamoorthy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 439 days.

This patent is subject to a terminal disclaimer.

(21) Appl. No.: 14/568,367

(22) Filed: Dec. 12, 2014

(65) Prior Publication Data

US 2016/0173402 A1 Jun. 16, 2016

(51) Int. Cl.
*G06F 15/16* (2006.01)
*H04L 12/26* (2006.01)
(Continued)

(52) U.S. Cl.
CPC ........ *H04L 43/0876* (2013.01); *G06F 3/0604* (2013.01); *G06F 11/3409* (2013.01); *H04L 43/0817* (2013.01); *H04L 43/16* (2013.01); *H04L 47/823* (2013.01); *H04L 67/1097* (2013.01); *H04L 43/12* (2013.01); *H04L 47/803* (2013.01)

(58) Field of Classification Search
CPC ......... H04L 47/70; H04L 43/12; H04L 67/32; H04L 67/10; H04L 67/30; H04L 43/0876
USPC ................................................... 709/223, 224
See application file for complete search history.

(56) References Cited

U.S. PATENT DOCUMENTS 5,802,291 A * 9/1998 Balick ..................... G06F 9/465
709/202
7,453,804 B1 * 11/2008 Feroz .................... H04L 43/026
370/229

(Continued)

OTHER PUBLICATIONS

Broussard et al., "System with On-Demand State for Applications," U.S. Appl. No. 14/919,792, filed Oct. 22, 2015.

(Continued)

*Primary Examiner* — David R Lazaro
(74) *Attorney, Agent, or Firm* — Nicholas D. Bowman

(57) ABSTRACT

Resources used by a plurality of applications that are located in system memory can be managed by monitoring usage statistics for the plurality of applications running on a hardware platform. Usage statistics for a particular application that are outside of a usage threshold profile can result in the creation of an on-demand profile that specifies a set of resources used by the particular application and a set of destination inputs mapped to the particular application. The destination inputs can be mapped to a management module. At least some of the resources of the set of resources used by the particular application can be released. Using the management module, an access to an input of the set of destination inputs can be detected. In response, resources of the set of resources can be allocated to the particular application.

9 Claims, 6 Drawing Sheets

(51) Int. Cl.
*H04L 12/911* (2013.01)
*H04L 29/08* (2006.01)
*G06F 3/06* (2006.01)
*G06F 11/34* (2006.01)
*H04L 12/927* (2013.01)

(56) References Cited

U.S. PATENT DOCUMENTS

| | | | |
|---|---|---|---|
| 7,945,911 | B1 | 5/2011 | Garthwaite |
| 7,996,846 | B2 | 8/2011 | McCarthy et al. |
| 8,244,882 | B2 | 8/2012 | Davidson |
| 8,600,347 | B2 * | 12/2013 | Mao ........................ H04L 12/14 455/406 |
| 8,607,082 | B2 | 12/2013 | Kamay et al. |
| 2002/0166117 | A1 * | 11/2002 | Abrams ............... G06Q 20/145 717/177 |
| 2002/0169878 | A1 * | 11/2002 | Orenshteyn ........... G06F 9/5055 709/227 |
| 2004/0190493 | A1 * | 9/2004 | Yao .................... H04W 76/068 370/352 |
| 2004/0194089 | A1 * | 9/2004 | McCarthy ............. G06F 9/5011 718/100 |
| 2008/0281974 | A1 * | 11/2008 | Slothouber ....... G06F 17/30867 709/229 |
| 2013/0097323 | A1 | 4/2013 | Barsness et al. |
| 2013/0120402 | A1 * | 5/2013 | Adams ...................... G06F 9/44 345/473 |
| 2013/0297668 | A1 | 11/2013 | McGrath et al. |
| 2013/0305083 | A1 * | 11/2013 | Machida ............... G06F 11/008 714/4.1 |
| 2014/0075439 | A1 * | 3/2014 | Wang .................. G06F 9/45558 718/1 |
| 2014/0123151 | A1 * | 5/2014 | Kishan .................. G06F 9/4881 718/103 |
| 2014/0279201 | A1 * | 9/2014 | Iyoob ................. G06Q 30/0631 705/26.7 |
| 2014/0280966 | A1 * | 9/2014 | Sapuram ............ G06Q 30/0631 709/226 |

OTHER PUBLICATIONS

IBM, "List of IBM Patents or Patent Applications Treated as Related," 2 pgs., Oct. 19, 2015.

Mell et al., "The NIST Definition of Cloud Computing," National Institute of Standards and Technology, U.S Department of Commerce, Special Publication 800-145, Sep. 2011.

* cited by examiner

US 10,009,248 B2

SYSTEM WITH ON-DEMAND STATE FOR APPLICATIONS

BACKGROUND

The present disclosure relates to placing applications in an on-demand state, and more specifically, to managing application states to provide on-demand usage while also managing their resource usage.

Cloud computing environments can support an extensive number of different primary applications and their dependent services. The ease of application creation and implementation, as well as the pace of change, can lead to applications been created and not necessarily being properly maintained. For example, application developers may create applications that are prototypes, temporary in nature, or that are simply forgotten. If the developers do not remove such old/unused applications from their cloud containers, these type of applications can continue to accumulate and take up require resources, despite the applications not being utilized. This type of situation can be particularly prevalent for freemium models, where simple applications can be created free of charge (but payment might be necessary to use additional enhanced capabilities).

SUMMARY

Various embodiments of the present disclosure are directed toward reducing resource usage for stale, or unutilized, applications that reside in a cloud computing environment. Particular aspects allow for the automatic detection and management of stale applications based upon usage statistics for the applications as compared to various usage profile thresholds. A management and monitoring application can be used to place the applications in an on-demand state, in which resources can be freed, and to recover from the on-demand state gracefully.

Consistent with embodiments, systems and methods can be described in connection with managing a plurality of resources used by a plurality of applications that are located in system memory. The method can include (and the system can be configured for) monitoring usage statistics for the plurality of applications running on a hardware platform; determining that usage statistics for a particular application of the plurality of applications are outside of a usage threshold profile; creating an on-demand profile that specifies a set of resources used by the particular application and a set of destination inputs mapped to the particular application; mapping the destination inputs to a management module; releasing, based upon the on-demand profile, at least some of the resources of the set of resources used by the particular application; detecting, while execution of the particular application is suspended and using the management module, an access to an input of the set of destination inputs; allocating, in response to the detecting and to the particular application, the at least some of the resources of the set of resources used by the particular application; and removing, in response to the detecting, the particular application from suspension.

According to embodiments, a computer program product can be provided for managing a plurality of resources used by a plurality of applications that are located in system memory. The computer program product can include a computer readable storage medium having program instructions embodied therewith, wherein the computer readable storage medium is not a transitory signal per se. The program instructions can be executable by one or more computer processor circuits to cause the one or more computer processor circuits to perform a method. The method can include monitoring usage statistics for the plurality of applications running on a hardware platform; determining that usage statistics for a particular application of the plurality of applications are outside of a usage threshold profile; creating an on-demand profile that specifies a set of resources used by the particular application and a set of destination inputs mapped to the particular application; mapping the destination inputs to a management module; releasing, based upon the on-demand profile, at least some of the resources of the set of resources used by the particular application; detecting, while execution of the particular application is suspended and using the management module, an access to an input of the set of destination inputs; allocating, in response to the detecting and to the particular application, the at least some of the resources of the set of resources used by the particular application; and removing, in response to the detecting, the particular application from suspension.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
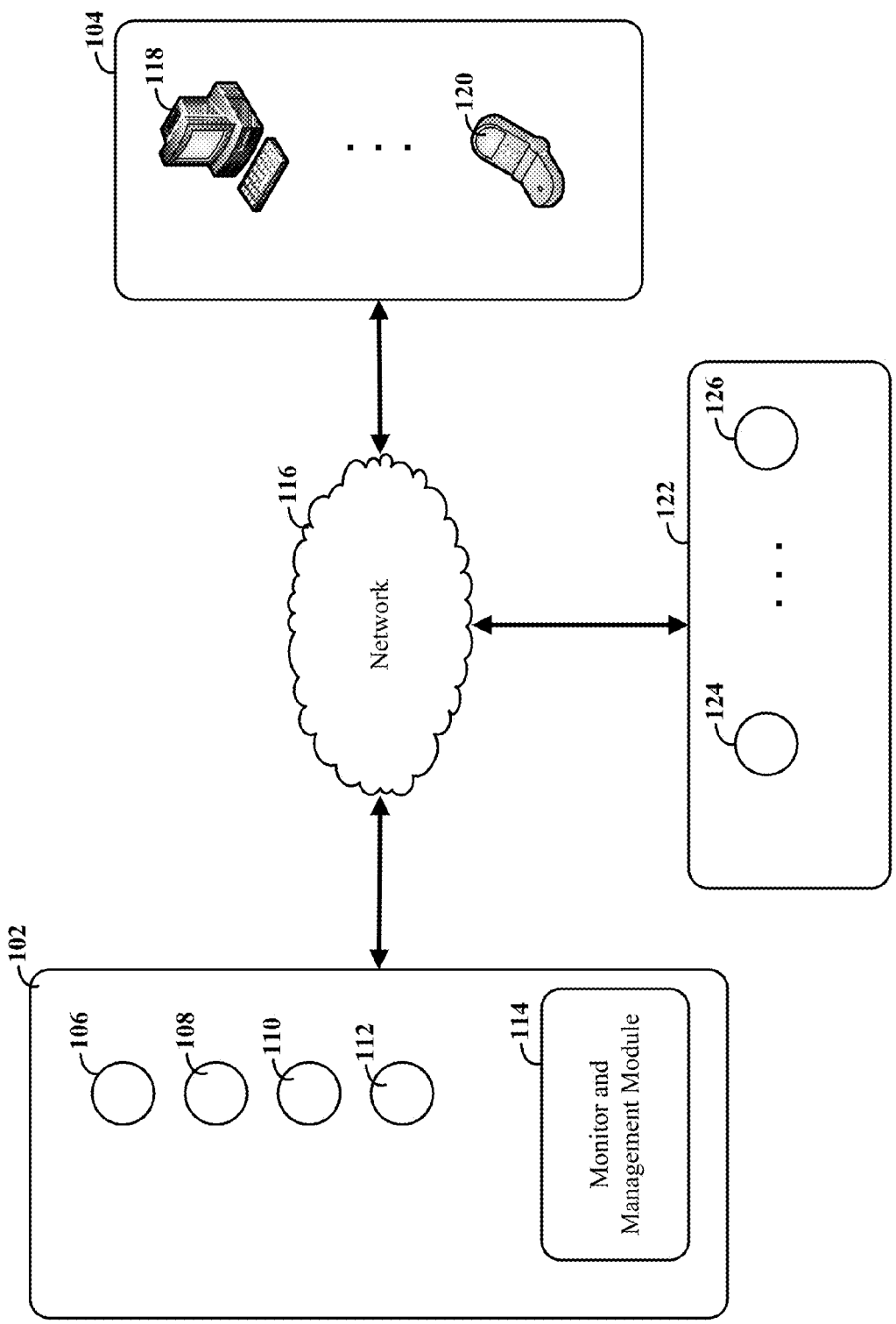
FIG. 1 depicts a block diagram of a system for managing applications, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to placing applications into an on-demand state, more particular aspects relate to managing application states to provide on-demand usage while also managing, and potentially reducing, their resource usage. While the present disclosure is not necessarily limited to such applications, various aspects of the disclosure may be appreciated through a discussion of various examples using this context.

Various embodiments of the present disclosure are directed toward a computer system that is configured to manage resources of applications located in a system memory of computer device and its associated hardware. By placing one or more supported applications into an on-demand state, the computer system can then release, or otherwise free up, resources tied to the applications that are not actively being used. In particular embodiments, the on-demand state can be configured to facilitate for the removal of the application from suspension using the prior process, as opposed to having to initialize and start a new process for the application.

Consistent with embodiments, the computer system can be configured to provide a cloud computing environment. For instance, the computer can be configured to provide one or more cloud containers in which the applications reside. Containers can be used as an alternative to using multiple virtual machines when a goal is to run multiple isolated systems on a single host.

In particular embodiments, the computer system can be configured to monitor applications in order to identify candidates for placing into an on-demand state, in which the function of application can be readily reinstated. The computer system can then identify resources for the candidates, including the identification of dependent services. If one or more of the candidates meets a threshold criteria (e.g., specified in usage threshold profile), they can then be placed into an on-demand state and at least some of their resources can be released.

Consistent with certain embodiments, usage statistics can be monitored for the various applications. This might include incoming access requests to the applications, outgoing data from the applications, storage activity (e.g., database/disk drive accesses), and other statistics. The system can determine that the usage statistics for a particular application are outside of a usage threshold profile. The usage threshold profile can specify a number of different relevant parameters for the various applications including, but not limited to, a threshold time, which statistics are relevant, a resource usage to threshold ratio, and others.

If the system determines that at least one usage statistic is outside of a usage threshold, an on-demand profile can be created for the application. The on-demand profile can specify which resources are used by the application and sources of input into the particular application. For instance, the on-demand profile can specify dependent services and their resources as well as open (destination) inputs (e.g., ports) linked to the particular application.

Based upon the profile, the computer system can map the destination inputs to a management module. The particular application can then be suspended by placement into an on-demand state in which the computer system does not run code for the particular application. For example, this can be accomplished by providing an external communication abstraction layer in the cloud operating environment so that the external inputs can be reconfigured to point to the monitoring module, and additionally a mechanism to save the state of the running application. While cloud service applications can be stateless, there may be a global state or configuration that can be persisted, saved, or suspended. The particular process can be placed into an on-demand state, while preserving state information (e.g., context), such as data related to the configuration of the application, cached data for performance, intermediate process data, and identity information of various resources in use that can be saved/restored later to bring the application back to essentially the same state. This state information can reside in computer memory when the process is executing and storage managed by the execution environment when the process is not actively executing. In some embodiments, a current image of the process can be stored for later use. The image can include information such as the executable code, a call stack, and a heap to hold intermediate computation data generated during run time. As discussed herein, the stored data can subsequently be used to return the process to active execution (e.g., by returning the operational parameters to their prior state). This can be particularly useful for removing the application from suspension, as opposed to having to initialize and start a new process for the application.

When the process of the cloud application is removed from the operating environment, some, or all, resources used by the cloud application can be released. When a subsequent communication or request is routed to the management module, the management module can request activation of the cloud application. The activation can include reassignment of resources (such as CPU/memory), reestablishment of the stored state of the application and environment, and reassigning the external communication inputs to the cloud application. The management module can then route the pending communication to the application.

In certain embodiments, the particular application can remain in system memory when placed into an on-demand state; however, it may be moved (directly or indirectly) to a swap device that provides virtual memory. Thus, while the inputs to the particular application are routed to a management module, the particular application is not removed from system memory. Due to inactivity of memory accesses to the pages for the particular application, the operating system may swap memory pages corresponding to the particular application into virtual memory, e.g., in favor of memory pages for more recently reused applications. This can be particularly useful for freeing up system memory, while avoiding the need to have a separate mechanism for retrieving the application from storage and for placement into system memory (when leaving the on-demand state).

Once the particular application is in the on-demand state, the computer system can begin freeing up, or releasing, the resources identified in the application's on-demand profile. The resources can then be used by other applications while the management module monitors/listens for accesses to the destination inputs/ports. If such an access is detected, the management module can then identify which application is associated with the port and allocate the appropriate resources.

Consistent with embodiments, the on-demand profile can include information useful for removing an application from an on-demand state. This may include, but is not necessarily limited to, the application owner and environment. Another example of information in the on-demand profile can include a list of endpoints and related configuration information. Service information can also be included so that dependent services can also be placed into a suspended/on-demand state and subsequently removed if the application is removed from suspension. In some instances, the dependent services could be shut down completely or removed from RAM for storage on disk (e.g., where restarting of a service from complete shutdown is relatively fast).

Turning now to the figures, FIG. 1 depicts a block diagram of a system for managing applications, consistent with embodiments of the present disclosure. One or more application developers can create and manage a set of applications 106-112. The applications 106-112 can be instantiated within a computer system 102. The computer system 102 can include one or more computer services, which can each include or more computer processors, computer memory, and other hardware components. In some embodiments, a cloud service provider can provide the developers with a cloud-based platform that hosts the applications. For instance, the computer system can include hypervisors, virtual machines, cloud containers, and combinations thereof. These virtualized components can support applications from various developers and with various different functions.

Consistent with embodiments, the applications 106-112 can each be allocated a number of different computing resources. The resources can include, but are not necessarily limited to, processor time, random access memory (RAM), disk space, network bandwidth, and combinations thereof. Application users 104 can access and otherwise use the applications 106-112. For example, an application may provide social networks or email services that are accessible using devices 118-120 and over network 116. Network 116 can include local area networks, wide area networks, private networks, the global Internet, and combinations thereof. Application users 104 can submit access requests for this service, which can be routed to the appropriate input(s) (e.g., port(s)) by the computer system 102.

In some embodiments, there can be multiple computer systems and platforms, as shown by 122 and applications 124-126. Such additional platforms could be provided by the same or different entities and may have different capacities and restrictions. Accordingly, the threshold limits for implementing an on-demand state can be different for different platforms, service providers, locations, applications, and for different combinations thereof.

According to embodiments of the present disclosure, monitor and management module 114 can be configured to monitor usage statistics for the applications 106-112 (and/or for applications 124-126). For example, the monitor and management module ("monitoring module") 114 can detect accesses to inputs, or ports, associated with the various applications. In some instances, the monitoring can be enabled for all applications, while in others, the monitoring could be for a subset of the applications. For instance, certain applications could be indicated as being high priority and left out of the monitoring function. These applications could be specified as such by the developer. The default, however, could be to monitor an application. Thus, prototype, temporary, and similar applications could be monitored, while critical applications, such as an email service, could be exempted from monitoring.

In certain embodiments, the monitoring module can be configured to detect when the usage statistics of a particular application are outside of a usage profile threshold. The usage profile threshold can be different for different applications, different developers, and for different service providers. For instance, a first set of applications might have a usage profile threshold that is exceeded when there are no accesses from users for a week. A second set of applications might have a usage profile that is exceeded when there are not database accesses for a month. In some instances, the usage profile could specify the expected recovery time from an on-demand state. For instance, a particularly simple application with few dependent services, might be simple to take in and out of the on-demand state, while a complex application might take much longer. Accordingly, the usage profile could specify a lower threshold for the simple application corresponding to the lower time and resource usage, or similar penalties, in implementing the on-demand state.

In response to detecting when the usage statistics of a particular application are outside of a usage profile threshold, the monitoring module can place the particular application into an on-demand state. As discussed herein, this can include freeing up resources otherwise used by the application in combination with placing the application into a state in which the resources will not be used without additional management from the monitoring module. The monitor module can be configured to implement the on-demand state such that it is transparent to the users of the application. For instance, the monitor module can map external connections (e.g., in-bound ports) to the monitor module. If an access to the external connections is detected, the monitor module can allocate the appropriate resources and remove the corresponding application from the on-demand state. The monitor module can also be configured to allow a developer to explicitly remove the application from the on-demand state.

A non-limiting example of inputs is a host name and a port designation/number. For instance, an application can be accessed by designating the host "container4" and a port number "87193" using the notation "container4:87193". A routing module can decode the request and forward the request to where the application actually resides, which may be different from the externally designated host and port number. The routing module can be configured to route "container4:87193) requests to the monitor module (e.g., to "monitor:14571"). Accordingly, the on-demand state will not result in a change to the functionality for an external user of the application. When the application is removed from the on-demand state, it could be placed into the same cloud container and port ("container4:87193), or into different container and/or port (e.g., "container3:54381"). The routing module can then be updated to forward future requests to the corresponding location. Moreover, the monitor module can forward the pending request to this location.

Particular embodiments include the identification of services that depend from the particular application along with an analysis of interdependencies between the services and other applications. Services that are not used by other applications can be placed into an on-demand state or halted.

In various embodiments, the usage profile can be dynamically adjusted based upon resource usage of the computer systems 102, 122. For instance, as the resource usage increases and the amount of available resources decreases, the usage profiles can be adjusted downward so that applications are placed into an on-demand state more frequently. In this manner, the aggressiveness of the on-demand state can be adjusted to accommodate the current system demands.

According to some embodiments, the monitoring module can be configured to notify a developer when a particular application is placed into an on-demand state. For instance, this may signal to the developer that a particular application is no longer being used (e.g., a prototype that was never removed), or has a problem (e.g., no users are able to access due to a system change). The developer can then take appropriate action, such as remove the application or fixing the application.

While the monitor module 114 is depicted as a single module operating on a single computer system 102, a variety of other configurations are possible. For instance, multiple instances of the monitor module 114 can be implemented on different computer systems. The different instances can operate independently or with varying levels of coordination. In some instances, the monitor module can work in conjunction with one or more modules, such as a separate management module that is configured to manage the on-demand state transitions for the various applications. Other combinations and configurations are also possible.

Figure 2:
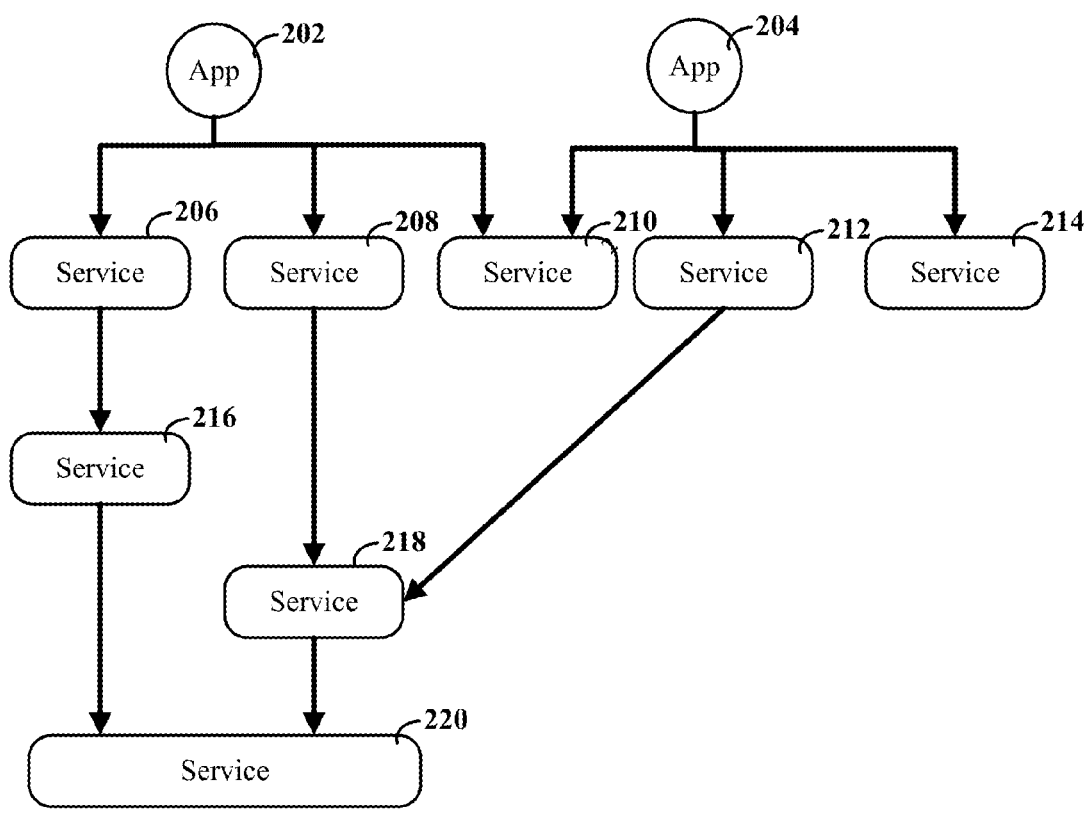
FIG. 2 is a graph that depicts service dependencies, consistent with embodiments of the present disclosure.

FIG. 2 is a graph that depicts service dependencies, consistent with embodiments of the present disclosure. Applications 202 and 204 can each use a different set of the depicted services 206-220. A management or monitor module can be configured to identify dependent services for an application that is designated for entering an on-demand state. For instance, application 202 could be specified for entrance into an on-demand state. Services 206, 208, 210, 216, 218, and 220 could then each be identified. Depending upon the service and the relationship to other applications, each of these identified services could then be placed into an on-demand state or halted. Their resources could then be released or unallocated.

Consistent with various embodiments, one or more of the identified services could also be used by one or more other applications, such as by application 204. The monitor module can be configured to detect such multiple dependencies and to determine an appropriate course of action. For instance, services 210, 218, and 220 could each be identified as depending also from application 204. In some embodiments, these services could then be left in an active state. In some embodiments, it may also be possible to release some of the resources for the services, but maintain enough for the remaining application.

Figure 3:
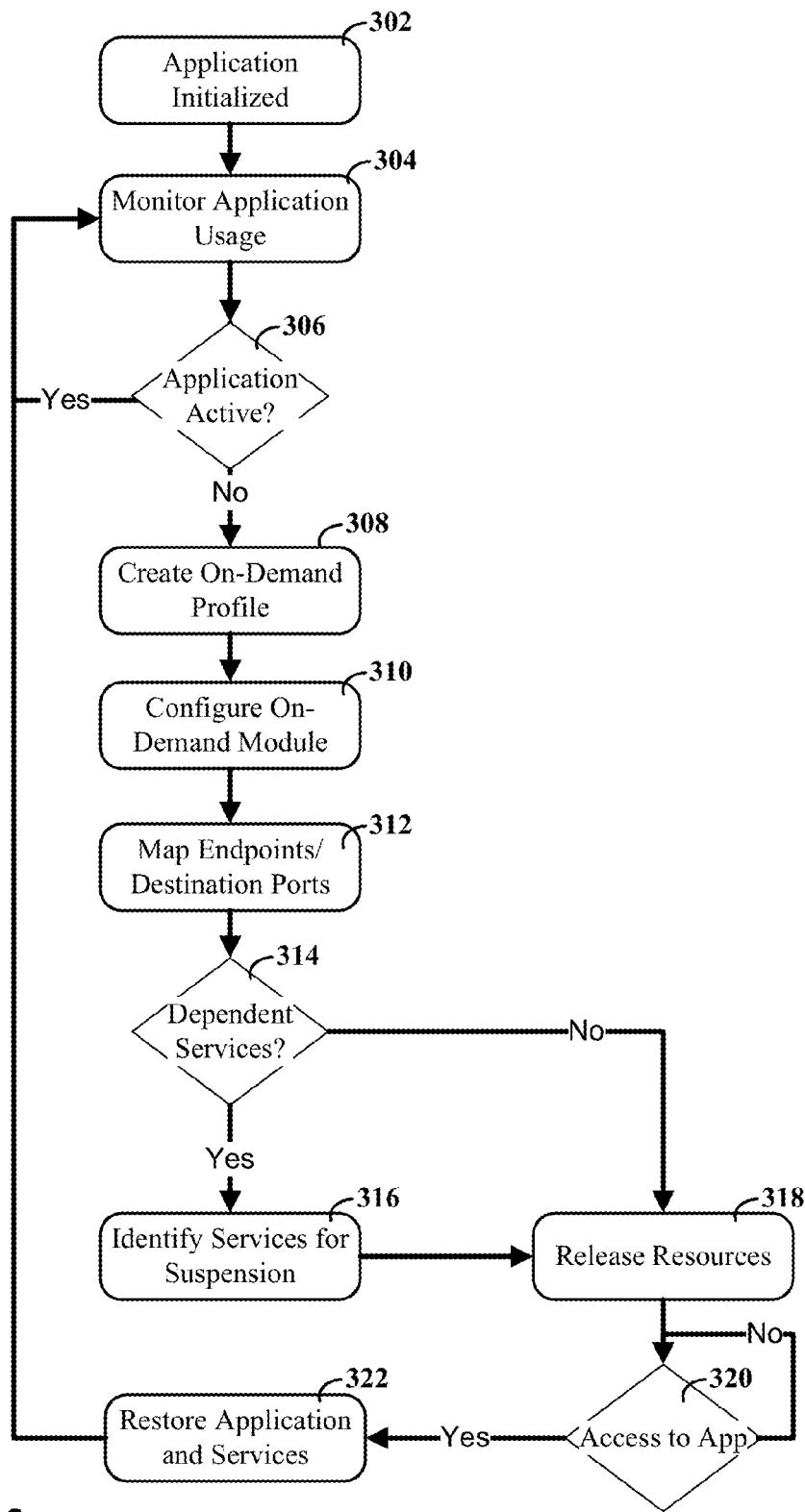
FIG. 3 depicts a flowchart for managing applications and using an on-demand state, consistent with embodiments of the present disclosure.

FIG. 3 depicts a flowchart for managing applications and using an on-demand state, consistent with embodiments of the present disclosure. An application instance can be initialized by a developer, per block 302. A monitor module running on a computer system (e.g., consistent with FIG. 1) can then begin monitoring the application usage, per block 304. As discussed herein, this can include monitoring various inputs and outputs of the application for activity. In some instances, the monitoring of block 304 can be contingent upon a setting that can be determined by the developer. If disabled, then the application instance is not monitored and will not enter an on-demand state.

The computer system can be configured to determine which application instances are stale/inactive and which are active, per block 306. As discussed herein, this can be based upon a usage threshold profile that specifies the limits of a stale and active application instance. The usage threshold profile can be different for different application instances, and can include factors such as the developer identification, current system resource availability, the type of application, and the service/priority level of the application instance. For instance, a cloud service provider may offer different tiers of services and a usage threshold profile for a higher tier may have a corresponding higher threshold. Thus, lower tiered applications would more readily be identified as stale or inactive.

If no application instance is stale, then the monitoring module can continue to monitor usage. If an application instance is stale, then the computer system can be configured to create an on-demand profile, per block 308. The on-demand profile can include configuration information that is relevant to entering and leaving the on-demand state for the particular application in question. This can include identification of input and output ports, dependent services, and allocated resources.

Once the on-demand profile is generated, the computer system can configure an on-demand management (monitoring) module for placement of the particular application instance into a suspended state, or an on-demand state, per block 310. This may include providing the on management module with application instance identifying information and with information regarding the hosting system. This information can then be used to place the application into an on-demand state where the hosting system will not run code for the application unless the management module takes the application out of the on-demand state. While the flowchart is described in terms of a particular application, the on-demand management module can be configured to handle a large number of concurrent applications that can be either active or in the on-demand state.

The computer system can then map the inputs and outputs (e.g., endpoints or destination ports) to the management/monitoring module, per block 312. Further accesses requests sent to the inputs of the application are handled by the monitoring module. In the case of multiple applications being in the on-demand state, the management module can store a table specifying the inputs and outputs associated with each application.

According to various embodiments, the system can also be configured to check for dependent services, per block 314. If dependent services are detected, the system can then identify which, if any, services can be suspended, halted, or have resources released, per block 316. This may include identifying multiple dependencies with other applications and their processes, as discussed in connection with FIG. 2. In addition to dependent services, the main process for the application can also be suspended from execution. This can include storing state information that can be used to subsequently remove the process from suspension. Resources no longer being actively used (either by the application or the services) can then be released, per block 318.

The computer system can then monitor for access attempts to the particular application, which is in the on-demand state, per block 320. Where there are multiple applications concurrently in the on-demand state, the system can identify that the access is for the particular application by correlating the destination of the request to the particular application. If an access attempt is detected, the system can then remove the particular application from the on-demand state (remove from suspension) and restore the application status as well as any dependent services, per block 322. This can include the allocation additional resources, restarting of services, and mapping the inputs back to the application being restored. The computer system can continue monitoring the various applications, per block 304.

In some embodiments, there may not be sufficient resources available to restore the application. Accordingly, the computer system can be configured to detect this condition and, in response, identify another stale application that is using resources that could be used by the application that is being restored. This process can include dynamic modifications to the usage threshold profile, which can be lowered until enough stale applications have been identified to free up sufficient resources.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
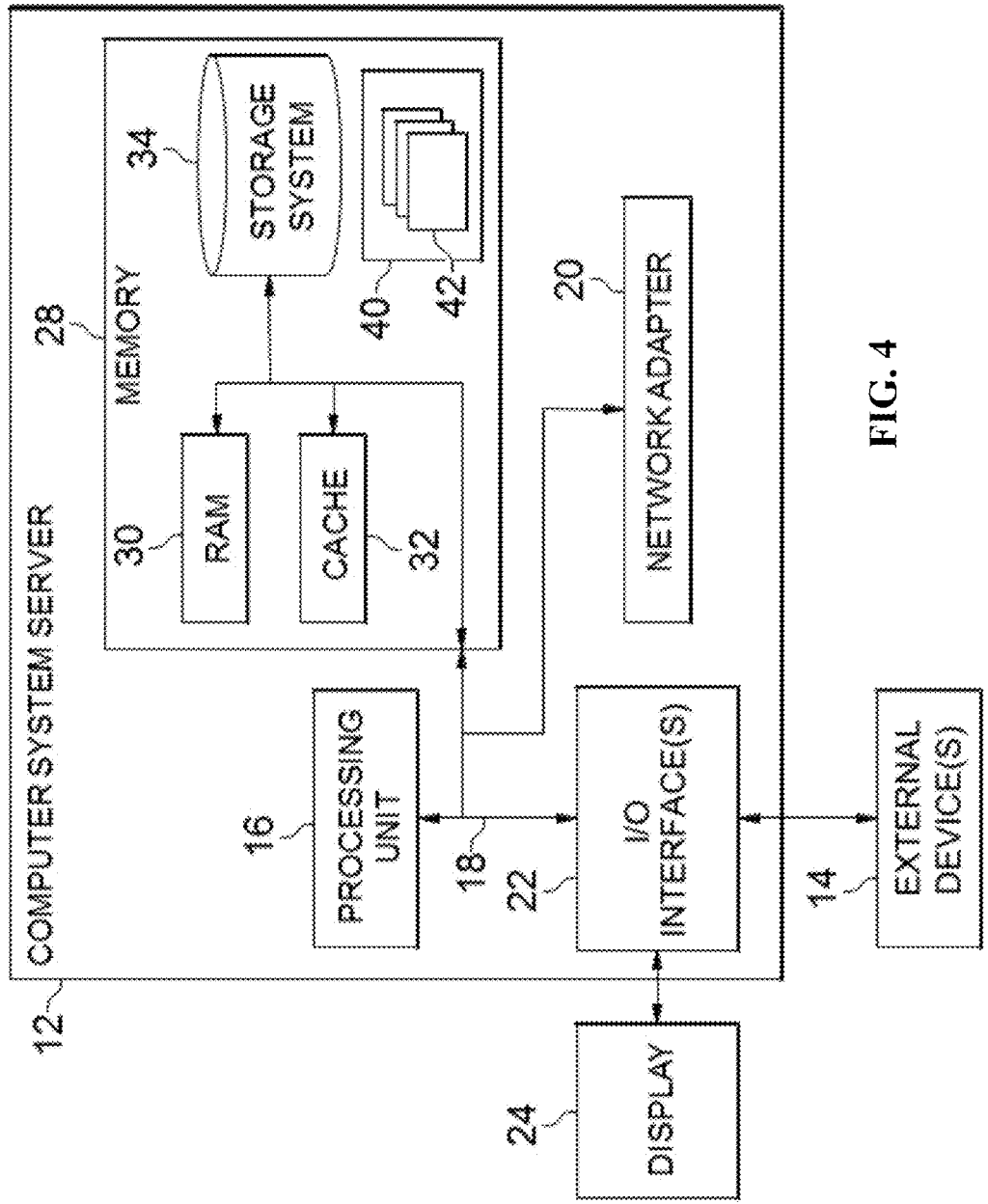
FIG. 4 depicts a cloud computing node according to an embodiment of the present disclosure.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
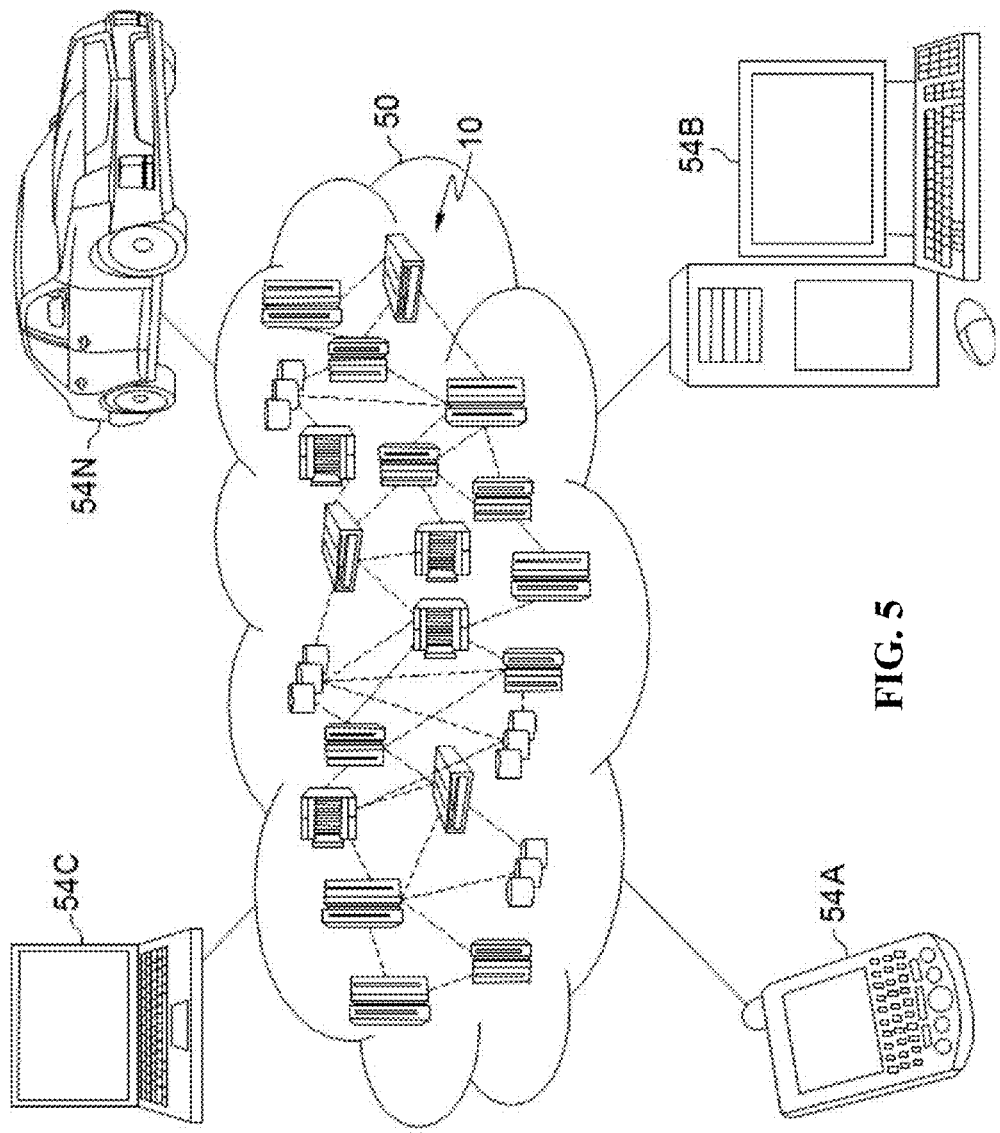
FIG. 5 depicts a cloud computing environment according to an embodiment of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
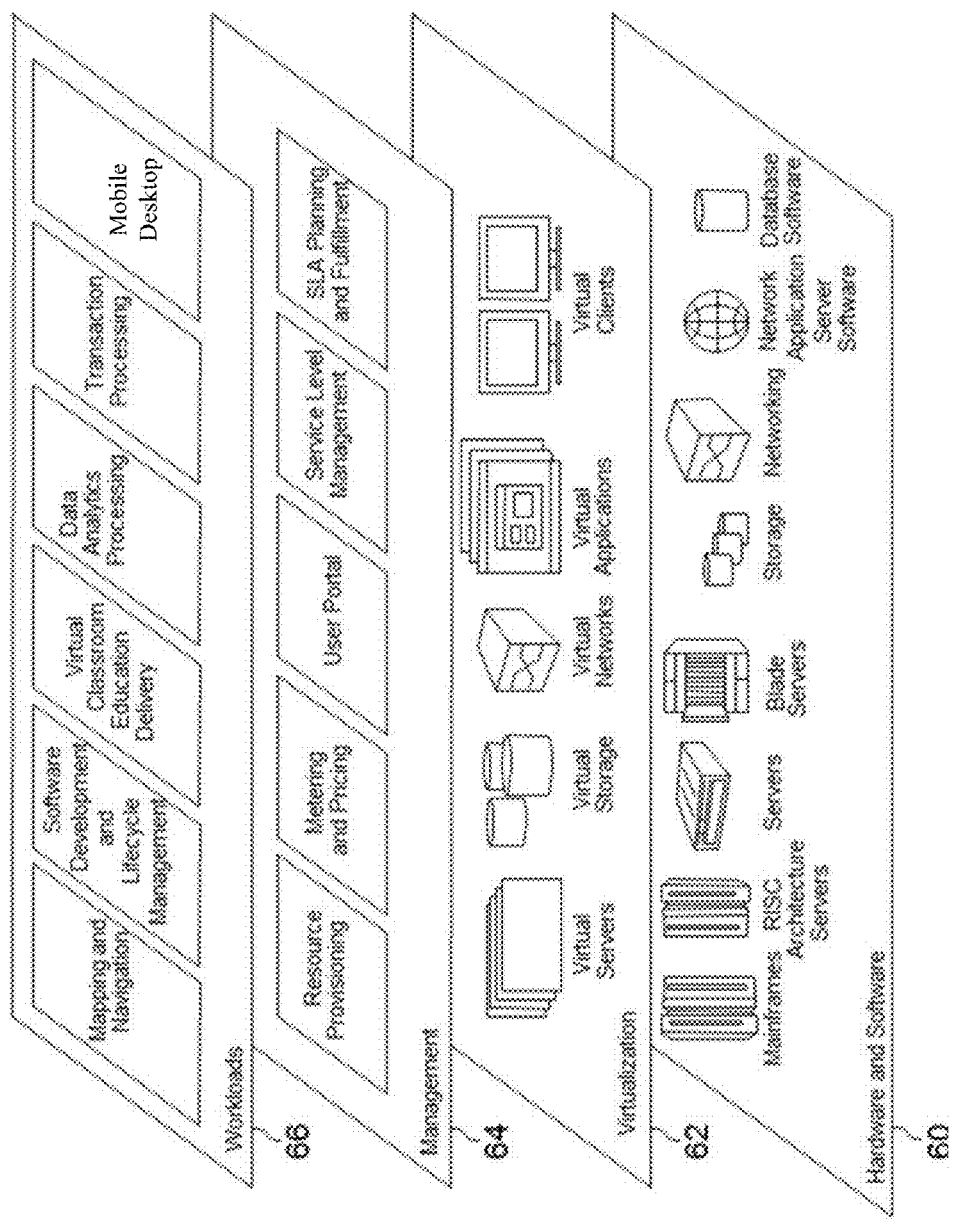
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes; RISC (Reduced Instruction Set Computer) architecture based servers; storage devices; networks and networking components. In some embodiments, software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Service level management can also provide for monitoring and management of applications relative to a suspended state, or on-demand state, as discussed in more detail herein.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer system for managing a plurality of resources used by a plurality of software applications that are utilized in a distributed computing environment and that are located in system memory on a hardware platform included within the distributed computing environment, the computer system comprising:
   one or more computer processor circuits configured to:
   monitor, for the plurality of applications running on the hardware platform, usage statistics indicating an activity level for the plurality of applications, the usage statistics including incoming application access requests, data storage activity, application priority level and outgoing data from the plurality of applications;
   determine that at least one usage statistic for a particular application of the plurality of applications is outside of a usage threshold profile;
   create an on-demand profile that specifies a set of resources used by the particular application and a set of destination inputs mapped to the particular application;
   map the destination inputs to a management module;
   release, based upon the on-demand profile, at least some of the resources of the set of resources used by the particular application;
   detect, while execution of the particular application is suspended and using the management module, an access to an input of the set of destination inputs;
   allocate, in response to the detecting and to the particular application, the at least some of the resources of the set of resources used by the particular application; and
   remove, in response to detecting an access to the input of the set of destination inputs, the particular application from suspension.

2. The system of claim 1, wherein the on-demand profile specifies a recovery time for the particular application of the plurality of applications.

3. The system of claim 1, wherein the usage threshold profile includes different threshold values for different applications of the plurality of applications.

4. The system of claim 1, wherein the on-demand profile identifies a plurality of services that the particular application is dependent upon and resources used by the plurality of services.

5. A computer program product for managing a plurality of resources used by a plurality of software applications that are utilized in a distributed computing environment and that are located in system memory on a hardware platform included within the distributed computing environment, the computer program product comprising a computer readable storage medium having program instructions embodied therewith, wherein the computer readable storage medium is not a transitory signal per se, the program instructions executable by one or more computer processor circuits to cause the one or more computer processor circuits to perform a method comprising:
   monitoring, for the plurality of applications running on the hardware platform, usage statistics indicating an activity level for the plurality of applications, the usage statistics including incoming application access requests, data storage activity, application priority level and outgoing data from the plurality of applications;
   determining that at least one usage statistic for a particular application of the plurality of applications is outside of a usage threshold profile;
   creating an on-demand profile that specifies a set of resources used by the particular application and a set of destination inputs mapped to the particular application;
   mapping the destination inputs to a management module;
   releasing, based upon the on-demand profile, at least some of the resources of the set of resources used by the particular application;
   detecting, while execution of the particular application is suspended and using the management module, an access to an input of the set of destination inputs;
   allocating, in response to the detecting and to the particular application, the at least some of the resources of the set of resources used by the particular application; and
   removing, in response to the detecting, the particular application from suspension.

6. The computer program product of claim 5, wherein the on-demand profile specifies a recovery time for the particular application of the plurality of applications.

7. The computer program product of claim 5, wherein the usage threshold profile includes different thresholds for different applications of the plurality of applications.

8. The system of claim 1, wherein the usage threshold profile includes a threshold value for incoming access requests for the particular application of the plurality of applications.

9. The computer program product of claim 5, wherein the usage threshold profile includes a threshold value for incoming access requests for the particular application of the plurality of applications.

* * * * *